United States Patent
Veits

(10) Patent No.: US 9,119,066 B2
(45) Date of Patent: Aug. 25, 2015

(54) METHOD AND ARRANGEMENT FOR POSITION-DEPENDENT CONFIGURATION OF A MOBILE APPLIANCE

(75) Inventor: Oliver Veits, Dachau (DE)

(73) Assignee: Unify GmbH & Co. KG, Munich (DE)

( * ) Notice: Subject to any disclaimer, the term of this patent is extended or adjusted under 35 U.S.C. 154(b) by 2134 days.

(21) Appl. No.: 11/992,140

(22) PCT Filed: Aug. 24, 2006

(86) PCT No.: PCT/EP2006/065620
§ 371 (c)(1),
(2), (4) Date: Mar. 17, 2008

(87) PCT Pub. No.: WO2007/036402
PCT Pub. Date: Apr. 5, 2007

(65) Prior Publication Data
US 2009/0165118 A1 Jun. 25, 2009

(30) Foreign Application Priority Data
Sep. 29, 2005 (DE) .......................... 10 2005 046 742

(51) Int. Cl.
*H04W 12/06* (2009.01)
*H04L 29/06* (2006.01)

(52) U.S. Cl.
CPC ............... *H04W 12/06* (2013.01); *H04L 63/08* (2013.01); *H04L 63/162* (2013.01)

(58) Field of Classification Search
CPC ...... H04L 63/08; H04L 63/162; H04W 12/06
USPC .......................................................... 726/14
See application file for complete search history.

(56) References Cited

U.S. PATENT DOCUMENTS 6,075,860 A * 6/2000 Ketcham ...................... 713/159
2002/0160811 A1* 10/2002 Jannette et al. ............... 455/560

(Continued)

FOREIGN PATENT DOCUMENTS

| EP | 1 458 151 A1 | 9/2004 |
| EP | 1 458 164 A2 | 9/2004 |
| WO | WO 01/74026 A1 | 10/2001 |

OTHER PUBLICATIONS

"Request for Comments: 3748, Extensible Authentication Protocol (EAP)", B. Aboda, L. Blink, J. Vollbrecht, J. Carlson, H. Levkowetz, Jun. 2004, pp. 1-68.*

(Continued)

*Primary Examiner* — Linglan Edwards
(74) *Attorney, Agent, or Firm* — Buchanan Ingersoll & Rooney PC

(57) ABSTRACT

An access element and method for controlling access of a network element are provided. A plurality of network elements which are connected to a connection of an access element and at least one second network element is connected to the access element via a first network element. The first network element is authenticated at the access element. Another operation of authenticating the first network element at the access element is initiated by the first network element. An authentication request which is transmitted by the access element and is received at the first network element is forwarded to the second network element. The second network element responds to the authentication request with a response message and the response message is forwarded to the access element via the first network element.

18 Claims, 1 Drawing Sheet

(56) References Cited

U.S. PATENT DOCUMENTS

| | | | |
|---|---|---|---|
| 2004/0038700 A1* | 2/2004 | Gibbs ........................... | 455/522 |
| 2004/0158735 A1* | 8/2004 | Roese ........................... | 713/200 |
| 2005/0125692 A1* | 6/2005 | Cox et al. ..................... | 713/201 |
| 2005/0152305 A1 | 7/2005 | Ji et al. | |
| 2006/0209705 A1* | 9/2006 | Sauter et al. .................. | 370/252 |
| 2006/0248229 A1* | 11/2006 | Saunderson et al. .......... | 709/245 |
| 2007/0064624 A1* | 3/2007 | Finn et al. ..................... | 370/254 |

OTHER PUBLICATIONS

IEEE Standard for Local and Metropolitan Area Networks, "Port-Based Network Access Control", Jul. 13, 2001, pp. i-viii, 1-134, IEEE Std 802.1X-2001, XP-002270244, LAN/MAN Standards committee of the IEEE Computer Society.

RFC2284 "PPP Extensible Authentication Protocol (EAP)" Merit Network, Inc. authors L. Blunk, J. Vollbrecht, Mar. 1998; http://www.msg.net/kadow/answers/estras/rfc/rfc2284.html.

* cited by examiner

METHOD AND ARRANGEMENT FOR POSITION-DEPENDENT CONFIGURATION OF A MOBILE APPLIANCE

CROSS REFERENCE TO RELATED APPLICATIONS

This application is the US National Stage of International Application No. PCT/EP2006/065620, filed Aug. 24, 2006 and claims the benefit thereof. The International Application claims the benefits of German application No. 10 2005 046 742.3 DE filed Sep. 29, 2005, both of the applications are incorporated by reference herein in their entirety.

FIELD OF INVENTION

The invention relates to an access element and a method for access control of a plurality of network elements at a port of the access element.

BACKGROUND OF INVENTION

Methods for controlling access by a network element to a packet-oriented or data network are known in the prior art. A network element obtains access to a data network by its identification and authentication information being transmitted to an authentication server via an access element. The authentication server checks the information of the network element and takes a decision whether to allow access by the network element. If a positive decision is made, the network element gains access via a released port of the access element. The access element is typically embodied as a switch or more generally as an access point.

In the following description consideration is given to access control of a first network element to which a second network element is connected, by way of an internal switch disposed in the first network element for example. The two network elements are connected e.g. in series to a port of the access element. Access control is performed for a particular port of the access element and is therefore also referred to as "port-related".

SUMMARY OF INVENTION

In an arrangement of this kind the following problem occurs. Following a successful authentication of one of the network elements, access is released for all network elements connected to the port of the access element. A release of this kind takes place for example following an authentication of the second network element, for the first and the second network element, without an identification or authentication of the first network element having been considered or, as the case may be, requested. As a result, access control provided at the access element has become ineffectual for the first network element.

The object of the invention is to ensure improved access control for a plurality of network elements connected to a port of an access element.

In a packet-oriented network the starting port therein is assumed to be a port of an access element—e.g. a switch or access point—at which at least one second network element is connected to the access element via a first network element. The second network element is connected for example in series to the first network element and ultimately to the port of the access element. Let the first network element already have been authenticated or, as the case may be, registered at the access element. In this case the inventive method for access control initially makes provision for a new authentication process of the first network element to be initiated at the access element. The authentication process is initiated by the first network element. The first network element then forwards an authentication request sent by the access element and received at the first network element to the second network element. The authentication request is then answered by means of a response message by the second network element, the response message being forwarded to the access element by way of the first network element.

By means of the method according to the invention a new authentication request of the access element is therefore initiated for the first network element, which authentication request is then inventively forwarded to the second network element. In this way an authentication of the second network element is enforced in an advantageous manner. An authentication of this type was hitherto not requested for the second network element in the prior art—disadvantageously with regard to network security—provided the first network element connected to the same port had already validly authenticated itself and had received a release at the access element.

A further advantage of the method according to the invention and the associated device is to be seen in the fact that an implementation only requires a comparatively simple modification in the control logic of the first network element. More particularly, no modification whatsoever of the access element or of an authentication server is necessary.

Advantageous developments of the invention are set forth in the dependent claims.

A particularly advantageous development of the invention provides two further method steps which make provision for the receiving and evaluating of a confirmation message sent by the access element in answer to the response message sent by the first network element and on the basis of said evaluation—i.e. release or denial of access at the access element for the second network element—provide a release or blocking of access of the second network element by the first network element. The basic inventive idea is therefore developed here in an advantageous manner by means of the core concept that the first network element for its part acts toward the second network element functionally as an "access element" insofar as the forwarded confirmation message is evaluated and then a release or blocking is initiated at the first network element.

An embodiment variant for the initiation of a new authentication process of the first network element at the access element by the first network element consists in the first network element deregistering at the access element by means of a corresponding notification or by means of other measures. This embodiment variant has the advantage of a simple implementation in software.

In an advantageous development of the invention a new registration of the first network element is provided for the aforementioned situation, wherein the initiation of a new authentication process was brought about by a deregistration of the first network element. The first network element therefore retains its functional role as an access-controlled network element toward the actual access element, while it acts toward the second network element functionally as an "access element".

An alternative embodiment variant for the initiation of a new authentication process of the first network element at the access element by the first network element consists in the first network element sending a request to the access element to perform a new authentication. The advantage of this variant lies in particular in the fact that the first network element is not temporarily out of service as a result of deregistration and new registration.

BRIEF DESCRIPTION OF THE DRAWINGS

An exemplary embodiment with further advantages and embodiments of the invention is explained in more detail below with reference to the drawing, in which.

DETAILED DESCRIPTION OF INVENTION

Figure 1:
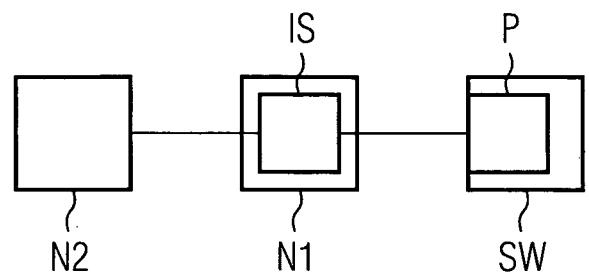
FIG. 1: shows a block diagram schematically representing two network elements connected in series to an access element.

FIG. 1 shows an access element SW having a connected first network element N1 to which a second network element N2 is in turn connected. The first network element N1 is connected to the access element SW via port P. The first network element N1 has an internal switch IS which ensures a data communication connection of both the first network element N1 and the second network element N2 to the access element. The internal switch is configured for example as a 3-port switch. An arrangement of this kind is often chosen in order to avoid complicated and time-consuming running of cables at a workplace.

An exemplary embodiment for an arrangement of this kind is a communication terminal operating according to the packet-oriented principle, e.g. a VoIP (Voice over Internet Protocol) telephone, which is connected as the first network element to a packet-oriented data network and provides a further such port for a second network element, for example a PC (Personal Computer) which can advantageously be connected to the data network in proximity to the telephone.

A widely established method for network-based access control is known from IEEE Standard 802.1x. The 802.1x standard describes an authentication and authorization method for use in data networks. Defined therein is a network access point which corresponds to a physical port in a local area network (LAN) or a logical port conforming to the specifications for a "wireless LAN" (WLAN) in the known IEEE 802.11 standard. At this network access point the authentication is performed by an access element or "authenticator" which in cooperation with the authentication server checks the authentication information transmitted by the network element acting as the "supplicant" and as appropriate allows or denies access to the network access point offered by the authenticator. The access element SW can in this case be embodied in any way, e.g. as a switch, an access point or as a network element having an internal switch.

A protocol frequently used in connection with 802.1x is the EAP (Extensible Authentication Protocol) according to RFC 2284 (RFC: Request for Comment) of the IETF (Internet Engineering Task Force). In this case EAP messages are packed in 802.1x messages.

There are three elements involved in a port-related authentication:
- a network element that is to authenticate itself as a supplicant in the data network,
- the authenticator in the access element which performs the authentication process with the network element, and
- the authentication server which makes the information required for the authentication available to the authenticator.

The IEEE 802.1x standard makes provision for two logical ports to be assigned to one physical port. The physical port unconditionally forwards the received packets to what is referred to as the free or "uncontrolled" port. The controlled port can only be accessed following an authentication which can be performed via the uncontrolled port.

The authentication server (not shown) is embodied for example in accordance with the known RADIUS server protocols (RADIUS: Remote Authentication Dial-In User Service). RADIUS is a client/server protocol which serves for authenticating users in the case of dial-in connections to a computer network. This protocol is used among other things for centralized authentication of dial-in connections via modem, ISDN, VPN or wireless LAN. An associated server service, the RADIUS server, is used for the authentication of network elements using databases in which the identification information of the respective network element, e.g. a MAC (Media Access Control) address of the network element and authentication information, e.g. a password, are stored.

Some authentication servers are often referred to also as AAA servers (AAA: Authentication, Authorization, Accounting) on account of extended functions.

Figure 2:
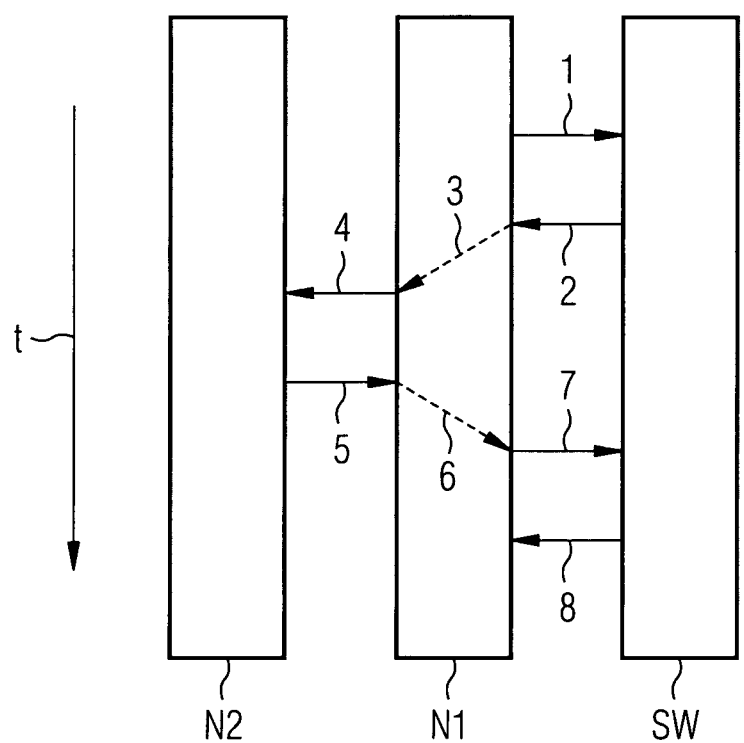
FIG. 2: shows a block diagram schematically representing a time sequence of controlling messages in connection with access control.

While making further reference to the functional units of FIG. 1, FIG. 2 shows a time sequence of controlling messages in connection with access control.

The time sequence is in this case initiated by switching on or activating the second network element N2, a personal computer N2 for example.

The following method steps in accompaniment with an exchange of messages are indicated in the drawing by means of arrows and an associated numeric reference sign. With reference to these reference signs, the method entails the following sequence of steps:

1 The first network element N1 initiates a new authentication process. Said process is triggered for example by transmission of an >>EAPOL-START<< which instructs the access element SW (authenticator) to perform an authentication. According to a second embodiment variant considered further below, the first network element N1 deregisters from the access element SW by means of a first control message 1. The first network element N1 advantageously simulates a situation in which the network cable is pulled and then plugged back in again in order to indicate to the access element SW that a new authentication is necessary. The first control message is preferably embodied as an EAP message 1 (EAP: Extensible Authentication Protocol).

2 By means of an authentication request 2 sent by the access element SW to the first network element N1, the deregistered first network element N1 is requested to (re-)authenticate itself.

3 The authentication request 2 is forwarded within the first network element N1 to the port provided for the second network element N2. The forwarding 3 is represented in the drawing by a dashed line.

4 The forwarded authentication request 4 arrives at the second network element N2. It essentially corresponds to the authentication request 2 received at the first network element N1.

5 The second network element N2 answers the authentication request 4 with a response message 5 containing its own identification and authentication information.

6 The response message 5 is forwarded within the first network element N1 to the port provided for the access element SW. The forwarding 6 is represented in the drawing by a dashed line.

7 The forwarded response message 7 arrives at the access element SW. It essentially corresponds to the response message 5 sent at the second network element N2.

8 A confirmation message 8 sent by the access element SW to the first network element contains information concerning whether a release has been granted or rejected.

The confirmation message 8 is evaluated at the first network element N1.

If access has been granted by the access element SW based on information contained in the confirmation message 8, in other words if authentication of the second network element N2 was successful, the network element N1 subsequently allows data traffic between the second network element N2 and the access element SW by way of the first network element N1.

If access was denied by the access element SW based on the information contained in the confirmation message 8, in other words if authentication of the second network element N2 failed, the network element N1 subsequently blocks any data traffic with the second network element N2, possibly with the exception of further 802.1x messages which are forwarded e.g. for a new authentication attempt.

Following the denial of access for the second network element N2, the first network element N1 advantageously re-registers with its own identification and authentication information.

In an embodiment of the first network element N1 as a communication terminal or telephone, this new registration is offered in order, in the event of access being refused to a personal computer N2 connected thereto, to at least place the authorized telephone N1 back into service.

The advantages of the means according to the invention compared with conceived alternative solutions to achieving the inventive object reveal themselves in particular in the case of an embodiment of the first network element N1 as a telephone. A somewhat disadvantageous alternative solution departing from the concept according to the invention could make provision for realizing both a supplicant and an authenticator in the first network element N1. The first network element N1 would then behave as a supplicant in the access element direction and as an authenticator toward the second network element N2. In the latter role the first network element would have to communicate with the authentication server (not shown). This alternative solution is disadvantageous in particular because then the protocols for communicating with the "backend", which is to say essentially the authentication server, would also have to be implemented. In the case of a telephone this leads to higher development costs and to an increase in the price of the devices, since more memory resources need to be provided.

Another alternative solution for achieving the inventive object would relate to a use of switches SW which perform an authentication of a plurality of network elements at one and the same port P of the switch SW. However, use of switches SW of this kind is not generally guaranteed in today's networks, which means that the method according to the invention is advantageous here, since it requires no specially embodied switch or access element SW.

On the other hand it is possible using the means according to the invention to ensure even in the case of 802.1x-standard-compliant Ethernet switches SW that a personal computer N2 does not gain access to the data network without authentication and at the same time to keep the implementation overhead of the connecting VoIP telephone N1 within limits.

With the inventively provided unchanged forwarding of EAP messages provided for the authentication process by way of the first network element N1, the first network element N1 acts as a "relay".

The method according to the invention does not necessarily have to be implemented exclusively in the first network element N1. Alternative embodiments include a distribution to individual components distributed across the network. The use of the IEEE 8021.x protocol for access control is also advantageous owing to its wide distribution, but is not mandatory.

The invention has been described in the foregoing with reference to an exemplary embodiment. It is understood that numerous modifications and variations are possible without thereby departing from the inventive concept underlying the invention.

The invention claimed is:

1. A method for access control of a plurality of network elements connected to a port of an access element, wherein at least one second network element is connected to the access element by way of a first network element and wherein the first network element is authenticated at the access element, comprising:
   initiating a new authentication process by sending a first message to the access element from the first network element;
   receiving by the first network element an authentication request sent by the access element in response to the initiation of the new authentication process;
   forwarding the authentication request by the first network element to the second network element;
   receiving by the first network element an answer of the authentication request via a response message sent by the second network element; and
   forwarding the response message to the access element from the first network element.

2. The method as claimed in claim 1, further comprising:
   receiving by the first network element a confirmation message sent by the access element;
   evaluating the confirmation message at the first network element to determine whether the second network element as authenticated with the access element or whether access to the access element by the second network element was denied by the access element;
   if the evaluation of the confirmation message indicates that the second network element was denied access, blocking access for the second network element at the access element via the first network element; and
   if the evaluation of the confirmation message indicates that the second network element was granted access, the first network element allowing data traffic between the second network element and the access element.

3. The method as claimed in claim 1, wherein the initiation of a new authentication process is effected via a deregistration of the first network element.

4. The method as claimed in claim 3, wherein if the second network element is blocked the method further comprises re-registering with the access element by the first network element.

5. The method as claimed in claim 2, wherein the initiation of a new authentication process is effected by transmission of a request to the access element to perform a new authentication.

6. The method as claimed in claim 2, wherein exchanging of messages and message structures are implemented on the basis of the IEEE 802.1x authentication protocol.

7. A first network element for connecting to an access element and for connecting a second network element to the access element, comprising:
   a first connection to a port of the access element;
   a second connection to the second element, wherein the second network element is connected to the access element via a first network element,
   wherein the first network element is authenticated at the access element, wherein a new authentication process is initiated by sending a first message to the access element from the first network element, wherein an authentication request sent by the access element is received in response to the initiation of the new authentication process, wherein the authentication request is forwarding to the second network element, wherein a response message sent by the second network element is received as an answer of the authentication request, and wherein the response message is forwarded to the access element.

8. The first network element as claimed in claim 7, wherein a confirmation message sent by the access element is received and evaluated, and wherein access for the second network element at the access element via the first network element is released or blocked as a function of the evaluation.

9. The first network element as claimed in claim 7, wherein the first network element is a packet-oriented communication terminal.

10. The first network element as claimed in claim 7, further includes a network-element-internal switch.

11. The first network element of claim 7 wherein the first network element receives a confirmation message sent by the access element;

wherein the first network element evaluates the confirmation message to determine whether the second network element is authenticated with the access element or whether access to the access element by the second network element was denied by the access element;

if the evaluation of the confirmation message indicates that the second network element was denied access, the first network element blocking access for the second network element at the access element; and if the evaluation of the confirmation message indicates that the second network element was granted access, the first network element allowing data traffic between the second network element and the access element.

12. The first network element of claim 11, wherein the initiation of the new authentication process is effected via a deregistration of the first network element via the first message.

13. The first network element of claim 12, wherein if the second network element is blocked, the first network element re-registers with the access element.

14. The first network element of claim 11 wherein the first network element is a terminal or telephone and the second network element is a personal computer or a computer.

15. The first network element of claim 11 wherein the first message is an Extensible Authentication Protocol (EAP) message or a control message.

16. The first network element of claim 11 wherein the access element is a switch or an access point, the first network element is a telephone and the second network element is a computer.

17. The method of claim 2 wherein the first network element is a terminal or telephone and the second element is a personal computer or a computer.

18. The method of claim 2 wherein the first message is an Extensible Authentication Protocol (EAP) message or a control message.

* * * * *